United States Patent
Priyanto et al.

(10) Patent No.: US 9,609,480 B2
(45) Date of Patent: Mar. 28, 2017

(54) METHOD AND APPARATUS FOR POSITIONING A MOBILE TERMINAL IN A RADIO NETWORK

(71) Applicant: Sony Corporation, Tokyo (JP)

(72) Inventors: Basuki Priyanto, Lund (SE); Anders Berggren, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 9 days.

(21) Appl. No.: 14/696,798

(22) Filed: Apr. 27, 2015

(65) Prior Publication Data

US 2016/0295366 A1    Oct. 6, 2016

Related U.S. Application Data

(63) Continuation-in-part of application No. PCT/EP2015/057130, filed on Mar. 31, 2015.

(51) Int. Cl.
*H04W 4/02* (2009.01)
*H04B 7/04* (2006.01)
*H04W 24/08* (2009.01)
*G01S 1/10* (2006.01)
(Continued)

(52) U.S. Cl.
CPC .............. *H04W 4/023* (2013.01); *G01S 1/10* (2013.01); *G01S 5/12* (2013.01); *H04B 7/0413* (2013.01); *H04W 24/08* (2013.01); *H04W 64/00* (2013.01)

(58) Field of Classification Search
CPC ..... H04W 4/023; H04W 24/08; H04B 7/0413
See application file for complete search history.

(56) References Cited

U.S. PATENT DOCUMENTS

| 2011/0054780 A1* | 3/2011 | Dhanani ................ G01C 21/26 701/465 |
| 2014/0235273 A1* | 8/2014 | Ahn ...................... G01S 5/0236 455/456.1 |
| 2016/0044630 A1* | 2/2016 | Markhovsky ....... H04W 64/006 455/456.6 |

FOREIGN PATENT DOCUMENTS

| EP | 1030531 A1 | 8/2000 |
| WO | 2015/012492 A1 | 1/2015 |
| WO | 2015/096809 A1 | 7/2015 |

OTHER PUBLICATIONS

International Search Report and Written Opinion from corresponding International Application No. PCT/WP2015/057130, mailed Dec. 9, 2015.

* cited by examiner

*Primary Examiner* — Kashif Siddiqui
(74) *Attorney, Agent, or Firm* — Tucker Ellis LLP

(57) ABSTRACT

A method for positioning a mobile terminal in a radio network including a plurality of base stations, comprising: transmitting a signal from a base station for receipt in the mobile terminal along a line of sight of a radio beam; receiving time measurement data from the mobile terminal, obtained based on receipt in the mobile terminal of the transmitted signal; calculating a distance value ($D_{LOS}$) for the distance from the base station to the mobile terminal based on the time measurement data; and calculating a vertical position ($D_v$) of the mobile terminal, based on the distance value and an elevation angle ($\theta$) of the line of sight of the radio beam from one or more of the plurality of base stations.

23 Claims, 2 Drawing Sheets

(51) Int. Cl.
*G01S 5/12* (2006.01)
*H04W 64/00* (2009.01)

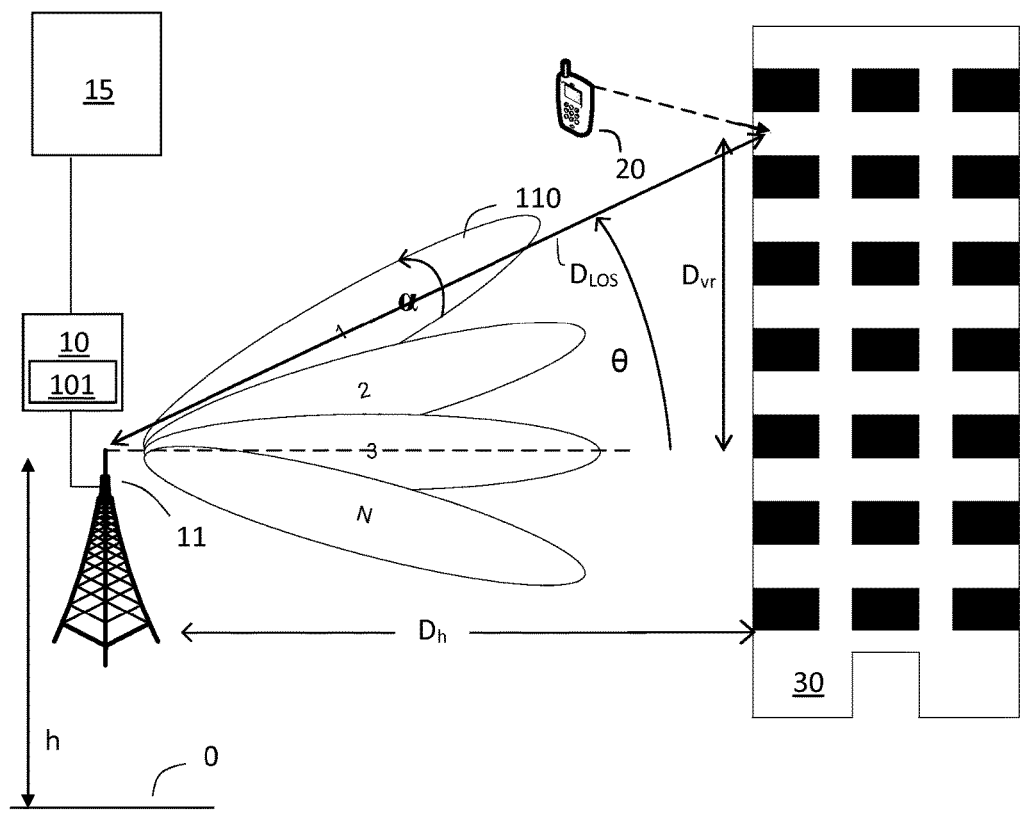
Fig. 1
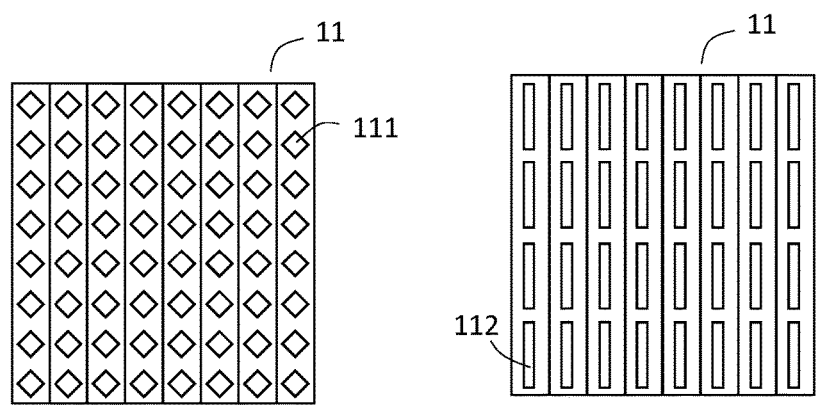
Fig. 2A                    Fig. 2B

METHOD AND APPARATUS FOR POSITIONING A MOBILE TERMINAL IN A RADIO NETWORK

CROSS REFERENCE TO RELATED APPLICATION

This application is a continuation-in-part of International Application No. PCT/EP2015/057130, filed Mar. 31, 2015, the disclosure of which is hereby incorporated herein by reference.

FIELD OF THE INVENTION

The present invention relates to method and an apparatus for positioning a mobile terminal in a radio network. More specifically, the invention relates to a solution for providing an estimate of a vertical position of a mobile terminal.

BACKGROUND

Satellite navigation systems provide autonomous geospatial positioning with global or regional coverage. At the present, the dominating GNSS is the Global Positioning System (GPS). A GPS receiver has the ability to determine its geographic location to within a few meters using time signals transmitted along a line-of-sight by radio from satellites. However, there are situations when it is not possible or even permitted for a portable electronic device with a GPS receiver to receive the satellite signals used for positioning. For example, satellite signals might be obscured or blocked when the handheld device is operated indoors, or in difficult urban areas with sky rises blocking the satellite signal. Still further, the GPS system might have inadequate coverage in a specific geographic area, or the satellite signals may be actively jammed to prevent positioning.

In addition to satellite navigation, different network-bases solutions for employment in cellular radio systems have been suggested throughout the years, mostly based on different forms of time of arrival measurement of a signal transmitted from a base station to a terminal, or vice versa. In LTE release 9, 3GPP introduced a positioning enhancement techniques called Observed Time Difference of Arrival (OTDOA). Basically, this technology involves measurement of relative time difference of arrival of signals from different base stations, and combining the time difference data to estimate the position of the terminal by network calculations upon receiving the signals. In OTDOA a specific set of dedicated physical signals called Positioning Reference Signal (PRS) have been defined, which makes it easier for the terminal to make accurate timing measurements. One of the reasons for introducing OTDOA has been to supply a system for assisting location determination of emergency calls.

SUMMARY OF THE INVENTION

Reports have it that more than half of all emergency calls are placed indoors, where satellite navigation is mostly unavailable. However, even with the use of OTDOA or other time of arrival measurement techniques, vertical positioning has hitherto not been satisfactory, i.e. determination of altitude of a mobile terminal. Furthermore, the US based regulatory body FCC (Federal Communications Commission) has released positioning requirements for mobile terminals in both vertical and horizontal. Thus, it is very important to identify positioning techniques that can fulfil these requirements. There is consequently a need for improvement in the field of vertical positioning of mobile terminals, a feature targeted by the solutions put forward herein.

According to a first aspect, this feature is targeted by means of a method for positioning a mobile terminal in a radio network, comprising the steps of, for each of a plurality of base stations:

transmitting a signal for receipt in the mobile terminal along a line of sight of a radio beam;

receiving time measurement data from the mobile terminal, obtained based on receipt in the mobile terminal of the transmitted signal;

calculating a distance value for the distance from the base station to the mobile terminal based on the time measurement data;

the method further comprising the step of calculating, with respect to one or more of the plurality of base stations, a vertical distance estimate of the mobile terminal based on the distance value and an elevation angle of the line of sight of the radio beam for that base station;

calculating a vertical position for the mobile terminal in dependence of one or more vertical distance estimates according to a predetermined rule.

In one embodiment, the predetermined rule includes the step of averaging a number of factors, each factor being proportional to each one of said vertical estimates.

In one embodiment, each factor is weighted dependent on the corresponding distance value.

In one embodiment, the method comprises the step of receiving a quality estimate of the time measurement in the mobile terminal of the signal transmitted from the respective base station, wherein each factor is weighted dependent on the corresponding quality estimate.

In one embodiment, the method comprises the step of receiving a beam width value for the respective radio beam in which the signal was transmitted from the respective base station, wherein each factor is weighted dependent on the corresponding beam width value.

In one embodiment, the method comprises the steps of:
determining a quality level for each calculated vertical distance estimate; and
selecting said one or more of said vertical distance estimates according to a quality level criterion.

In one embodiment, the method comprises the steps of:
determining a quality level for each calculated vertical distance estimate; and
selecting the vertical distance estimate having the best quality level as base for calculating the vertical position.

In one embodiment, said quality level is determined dependent on at least one of: the corresponding distance value; a beam width value for the corresponding radio beam; and a quality estimate of the receipt in the mobile terminal of the signal transmitted from the corresponding base station.

In one embodiment, the step of calculating a vertical distance estimate is carried out in a location server.

In one embodiment, each of said one or more base stations send data to the location server, representative of at least one of: the elevation angle, a beam width value for the corresponding radio beam, and a vertical height of an antenna of the base station over a reference level.

In one embodiment, each of said one or more base stations broadcast data representative of at least one of: the elevation angle, a beam width value for the corresponding radio beam, and a vertical height of an antenna of the base station over a reference level, which data is detected by the mobile terminal and reported to the location server together with the time measurement data for the corresponding base station.

In one embodiment, said quality level correlates to a level of accuracy of the respective vertical distance estimate.

According to a second aspect, this feature is targeted by means of a method for positioning a mobile terminal in a radio network including base stations, comprising the steps of:

transmitting a signal from a base station for receipt in the mobile terminal along a line of sight of a radio beam;

receiving time measurement data from the mobile terminal, obtained based on receipt in the mobile terminal of the transmitted signal;

calculating a distance value for the distance from the base station to the mobile terminal based on the time measurement data;

calculating a vertical position of the mobile terminal, based on the distance value and an elevation angle of the line of sight of the radio beam.

In one embodiment, the base stations transmit through an antenna including a plurality of antenna elements, comprising the step of:

retrieving said elevation angle based on an antenna precoding scheme for said antenna elements.

In one embodiment, each precoding scheme corresponds to one elevation angle value, wherein the step of retrieving said elevation angle includes the step of mapping the precoding scheme to elevation angle in the base station.

In one embodiment, the base stations transmit according to a Multiple Input Multiple Output (MIMO) antenna scheme.

In one embodiment, the calculated distance value represents a line of sight distance.

In one embodiment, said time measurement data represents observed time difference of arrival in the mobile terminal of signals transmitted from two or more base stations.

In one embodiment, said signal includes positioning reference symbols (PRS), and wherein said time measurement data is established based on said positioning reference symbols.

In one embodiment, the method comprises the step of calculating a horizontal position of the mobile terminal, based on the first distance value and the elevation angle of said line of sight.

In one embodiment, said signal includes data which identifies the radio beam in which it is transmitted, and wherein said time measurement data includes an identification of the identified radio beam.

In one embodiment, the mobile terminal is concurrently connected to at least two base stations, and receives information from each connected base station data which identifies the radio beam in which the respective signal is transmitted.

According to a third aspect, the above-referenced feature is targeted by an apparatus for positioning mobile terminals in a radio network, which apparatus comprises a data processing device and is connected to a plurality of base stations which are configured to transmit signals for receipt in a mobile terminal along a line of sight of a radio beam, wherein the apparatus is configured to receive time measurement data, obtained based on receipt in the mobile terminal of said transmitted signals, and to calculate a distance value for the distance from base station to the mobile terminal based on the time measurement data for the corresponding base station, characterized in that that the apparatus is configured to calculate a vertical distance estimate of the mobile terminal, based on the distance value and an elevation angle of the line of sight of the radio beam.

In one embodiment, the apparatus is configured to calculate vertical distance estimates with respect to each one of a number of base stations, and to calculate a vertical position for the mobile terminal in dependence of one or more of said vertical distance estimates according to a predetermined rule.

In various embodiments, the apparatus is further configured to carry out the steps of any of the preceding method steps.

BRIEF DESCRIPTION OF THE DRAWINGS

Embodiments of the invention will now be described herein by way of example only, with reference to the accompanying schematic drawings.

FIG. 1 is a schematic representation of a scenario of positioning a mobile terminal according to an embodiment.

FIGS. 2A and 2B schematically illustrate exemplary base station antennas for use in various embodiments.

DETAILED DESCRIPTION OF EMBODIMENTS

Figure 3:
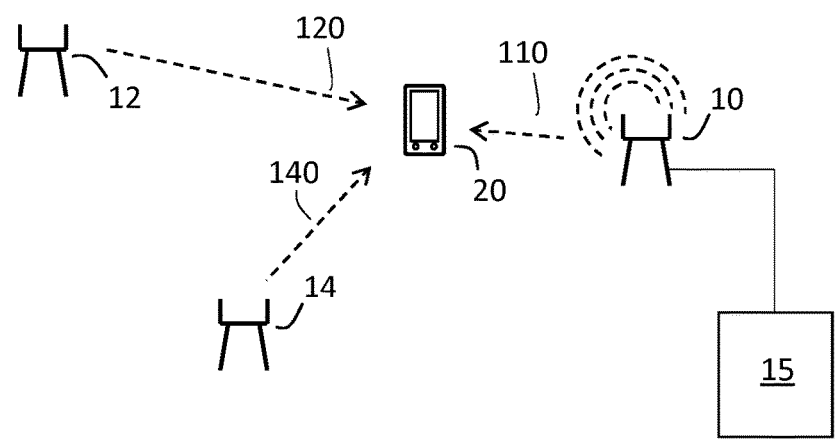
FIG. 3 shows an outline for an embodiment of positioning with use of a plurality of base stations in accordance with an embodiment.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, which may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Currently in 3GPP, a study on the use of a Full Dimension Multiple Input Multiple Output (FD-MIMO) antenna scheme is carried out. The objective behind the use of MIMO in general, such as FD-MIMO, is simply to increase the number of users that can be covered with one base station, or eNode B (eNB) as it is specifically labelled in LTE. This is carried out by providing transmission to a mobile terminal, labelled user equipment in LTE, within a radio beam using a beamforming antenna connected to the base station. FD-MIMO involves not only horizontal (azimuth) beamforming, but also vertical (elevation) beamforming, and one aspect when doing beam forming is to direct the transmission to the mobile terminal using a number of antenna elements at the base station creating a radio beam in a certain direction. This will improve coverage for mobile terminals at a cell edge, and reduce interference for mobile terminals in other parts of the cell.

FIG. 1 illustrates a scenario where a mobile terminal 20 is located at a certain altitude, more specifically at a certain floor level in a building 30. The terminal 20 is communicatively connected to a radio network, preferably a cellular network such as an LTE network. In the network, radio communication with mobile (or stationary) terminals of the system is carried out by means of a plurality of base stations. Each base station comprises a data processing device which is connected to an antenna, also referred to as an antenna system. In FIG. 1, only one base station 10 is shown, having a data processing device 101 comprising one or more data memories containing computer code, which may be executed by the data processing device 101 so as to carry out the tasks and calculations required for a base station. The base station includes or is connected to an antenna 11. The exact setup of the base station may differ between different types of radio systems, and these elements are thus only schematically represented herein. Each base station is connected to a backbone network, which may involve different nodes or entities for providing different services in or through the radio network, as is well known in the art of radio communication. In the embodiment of FIG. 1, a location server 15 is illustrated, which is connected to the radio network, and more specifically to the base station 10 through the core network. As will be evident to the skilled reader, the location server 15 is typically not directly connected to the base station 10, but is rather physically present at another place in the network. Various embodiments will be outlined below, described as at least partly carried out in the location server. However, it will be understood that parts or all of the functions described herein may be carried out in other parts of the radio network, and also in the terminal 20.

In the embodiment of FIG. 1, the base station 10 and its antenna 11 are configured to operate a MIMO scheme, and preferably an FD-MIMO scheme. Such a system makes use of a very large number of service antennas, up to hundreds or thousands, which are operated fully coherently and adaptively. Extra antennas help by focusing the transmission and reception of signal energy into ever-smaller regions of space, referred to herein as radio beams. In FIG. 1 four such beams (1, 2, 3, N) are illustrated by means of example, having different elevation angles θ.

FIGS. 2A and 2B show, by way of schematic illustration, two different examples of MIMO antennas 11, also referred to as antenna arrays. Each antenna 11 includes a plurality of antenna elements, arranged in a two-dimensional pattern. FIG. 2A shows a form factor including an 8×8 pattern of uniform antenna elements 111, which may be of a quarter wavelength size (λ/4), separated by half the wavelength (λ/2) of a carrier frequency for the system in question. For a 2.5 GHz embodiment, the antenna element separation would be in the order of 6 cm, as a matter of example. In the example of FIG. 2B, an 8×4 form factor is instead shown, comprising rectangular elements 112. In this example, each antenna element may be a quarter wave in width, but 2λ high, with a separation of λ/2 both horizontally and vertically. The exact configuration of an MIMO antenna 110 is not the object of this application, and further details thereof will not be discussed herein. As already noted, though, there is an ongoing development towards larger and larger antennas 110, with an increasing number of antenna elements, which will increase the capability of beam forming and steering.

Referring back to FIG. 1, a general embodiment may be described, related to a method for positioning a mobile terminal 20 in a radio network including base stations. In one embodiment, a base station 10 transmits a signal for receipt in the mobile terminal 20, along a line of sight of a radio beam 1. The radio beam may be one of a plurality of available radio beams 1, 2, 3, N for which transmission may be carried out with respect to that base station 10. The mobile terminal 20 is configured to obtain time measurement data, based on receipt in the mobile terminal 20 of the transmitted signal. The time measurement data may include or be based on a time of arrival measurement result, indicative of a flight time for the signal between the base station 10 and the mobile terminal. The time measurement data may be measured with respect to the signal received in the terminal 20 from the base station 10 only, or alternatively on signals received from base station 10 and also from other base stations (not shown in FIG. 1) of the radio network. A distance value $D_{LOS}$ for the distance from the base station 10 to the mobile terminal 20 is calculated based on the time measurement data. In one embodiment, this may be carried out in the terminal 20, and reported to the network. In another embodiment, the time measurement data is received in the network, e.g. in the node referred to herein as a location server 15, in which the calculation of $D_{LOS}$ is carried out. A vertical position of the mobile terminal 20 is then calculated, based on the distance value $D_{LOS}$, and an elevation angle θ of the line of sight of the radio beam 1, in which the signal was transmitted from the base station 10 to the mobile terminal 20. In one embodiment, this step may be carried out by the calculation of a relative vertical distance $D_{vr}$ with respect to the base station 10, or more correctly the base station antenna 11, according to $$D_{vr}=D_{LOS}*\sin(\theta).$$

This vertical distance $D_{vr}$ may be used as the vertical position. In another embodiment, the vertical position may further be calculated with respect to a certain reference level, such as sea level 0, as $$D_v=h+D_{vr}.$$

In yet another embodiment, the vertical position may be related to the actual context in which the mobile terminal 20 is located. As an example, it may be calculated that the vertical distance translates to floor 6 in the building 30 in question, and may thus be displayed or stored as a floor level value, of the building in question.

FIG. 3 illustrates an embodiment, in which a plurality of base stations 10, 12, 14 are employed in the positioning of the mobile terminal 20. Other details, which are shown in FIG. 1, are left out for the sake of simplicity. In this scenario, the mobile terminal 20 may be connected to one base station 10, acting as a serving cell. The mobile terminal 20 also receives neighbour cell information from the serving cell 10, and is thereby instructed to listen to signals 120, 140 transmitted from the respective base station 12, 14, which are received in the mobile terminal 20 along a line of sight of a respective radio beam, e.g. similar to what is outlined in FIG. 1. The mobile terminal 20 may then establish time measurement data, obtained based on receipt in the mobile terminal of the transmitted signals 110, 120, 140. In an embodiment based on OTDOA, the time measurement data may include time difference data related to relative time of receipt of PRS signals from at least two of the base stations 10, 12, 14. The base stations 10, 12, 14 send Positioning Reference Signals 110, 120, 140 and the mobile terminal 20 measures the signals' time of arrival followed by reference signal time different (RSTD) measurement. This time measurement data is transmitted to the location server 15, through the serving cell. Therein, a distance value for the distance from the respective base station 10, 12, 14 to the mobile terminal 20 may be calculated based on the time measurement data. The step of calculating a vertical position for the mobile terminal 20 may then be carried out based on the established distance value $D_{LOS}$ to the serving base station 10, and an elevation angle θ of the line of sight of the radio beam.

As outlined for the example of FD-MIMO, the base stations 10, 12, 14 each have multiple antenna beams directed towards the mobile terminal 20. For the serving cell, operated by base station 10, the mobile terminal 20 will normally be connected to the beam that provides a better signal to noise and interference ratio. Each beam may be configured with specific 3 dB beam width for both horizontal and vertical dimension. The base station 10 has a certain elevation angle θ for each beam, in addition to a certain horizontal, or azimuth, angle. Each elevation angle θ may correspond to an antenna precoding scheme, for example one-to-one mapping, of a FD-MIMO system. In one embodiment, the relation between precoding scheme and beam elevation angle is maintained by the respective base station 10, 12, 14. In another embodiment, this relation may be stored in the location server 15. The antenna 11 precoding is decided by the base station 10, and is typically based on feedback from the mobile terminal 20, reporting in which beam the best signal is received. In principle, the base station 10 transmits reference signals and the mobile terminal 20 finds the radio beam that provides the best channel quality. In LTE systems, the reference signals can e.g. be Channel State Information-Reference Symbols (CSI-RS), or dedicated PRS signals. For example, a modified version of PRS LTE release 9 may be employed in order to support FD-MIMO PRS. The selected channel, i.e. beam, is reported back to the base station 10, in which the corresponding precoding can be assessed.

In one embodiment, the step of calculating a vertical position for the mobile terminal may be carried out by taking account of measured data relative to more than one base station 10. In one embodiment, the signals 110, 120, 140 include data not only representative of the originating base station 10, 12, 14, but also of a corresponding radio beam of the respective base station 10, 12, 14. This identification may e.g. be assessed based on the setting of a number of bits in the transmitted signal 110, 120, 140, and this data may be reported to the location server 15 through the serving cell base station 10, with the time measurement data. In addition, the corresponding elevation angle θ for the respective radio beam may be determined for the determined radio beam, as explained above. In one embodiment, the location server 15 may query the respective base stations 12, 14 to which the mobile terminal 20 is not communicatively connected, to retrieve information on precoding scheme. Alternatively, the elevation angle θ, based on the radio beam data received from the mobile terminal 20, may be obtained from a mapping table for radio beam identity to elevation angle θ in the base station in question. In another embodiment, this information may already be available in the location server 15, such as e.g. by means of a mapping table for radio beam identity to elevation angle θ, for each of the plurality of base stations.

In yet another embodiment, transmitted signals 110, 120, 140 may be directly coded, or include data, representing the actual beam angle value. In order to make the terminal able to obtain elevation angle of each surrounding base-station, a modified version of current practice PRS may be used to support FD-MIMO PRS, so that each PRS can correspond to a specific beam. Based on the received multiple PRS, the UE calculate and find the PRS that giving best quality. In this case, the UE can detect the best/right angle. Such PRS data, or the angle value deduced therefrom, may then be reported by the terminal 20 to the location server 15 for further calculations, as described.

In another embodiment, a mobile terminal 20 may be connected to two serving cells, i.e. two base stations, using Carrier Aggregation (CA). In 3GPP, this is referred to as dual connectivity (DC). In such an embodiment, the selected radio beams, one for each base station, can be reported from the mobile terminal 20 directly to the respective base station. Those base stations may then report to corresponding precoding scheme, or elevation angle θ, to the location server 15.

A vertical distance estimate of the mobile terminal 20 may be calculated with respect to one or more of the plurality of base stations 10, 12, 14, based on the distance value $D_{LOS}$ and elevation angle θ of the line of sight of the radio beam for that base station 10, 12, 14. The vertical position for the mobile terminal 20 may then be calculated in dependence of one or more of the vertical distance estimates, according to a predetermined rule. In one embodiment, this rule may include the step of averaging a number of factors, where each factor is proportional to each one vertical estimate. Each of those factors may in addition be weighted. A vertical position may be calculated with respect to a certain reference level, such as sea level 0, as $D_{vn}=h_n+D_{vrn}$, for one or more of the base stations 10, 12, 14. The calculated average of the vertical position may then be expressed as:

$$D_v = \frac{\sum_{n=1}^{N} Dvn * Wn}{N}$$

In one embodiment, each factor is weighted by $W_n$ dependent on the corresponding distance value. Even with an accurate determination of elevation angle θ, the error will be greater in terms of vertical distance when the distance $D_{LOS}$ to the base station is longer. In another embodiment, a quality estimate is made of the time measurement quality (i.e. RSTD measurement quality) in the mobile terminal 20 from the respective base station 10, 12, 14, wherein each factor is weighted dependent on the corresponding quality estimate $W_n$. In yet another embodiment a beam width value α for the respective radio beam, in which the signal was transmitted from the respective base station 10, 12, 14, is used to calculate a weight factor $W_n$, wherein each factor is weighted dependent on the corresponding beam width value α.

In another embodiment averaging is not carried out on all vertical distance estimates, but a comparison and selection is first carried out. In one example, a quality level for each calculated vertical distance estimate is determined, and then one or more of said vertical distance estimates are selected for averaging according to a quality level criterion. In various embodiments, the quality level may be determined dependent on at least one of: the corresponding distance value $D_{LOS}$; a beam width value α for the corresponding radio beam; and a quality estimate of the receipt in the mobile terminal of the signal transmitted from the corresponding base station as explained above. In one embodiment, the quality level correlates to a level of accuracy of the respective vertical distance estimate, which may be assessed by calculation of error margin of each factor in the calculation of the respective vertical distance estimate, i.e. inter alia, the time measurement data, the elevation angle θ, the beam width α, etc.

In another embodiment, another rule is applied. A quality level for each calculated vertical distance estimate is determined, e.g. in accordance with any one of the examples outlined in the preceding paragraph. Thereafter, the vertical distance estimate having the best quality level is selected as base for calculating the vertical position. As an example, a vertical distance estimate is obtained for a serving base station 10, and for another base station 12. The accuracy of the respective calculated vertical distance estimates are then compared, and the one that is determined to be most accurate is used to determine the vertical position of the mobile terminal 20.

In various embodiments, a vertical distance estimate of the mobile terminal 20 is only calculated for one base station 10, based on the distance value and an elevation angle of the line of sight of the radio beam for that base station. As an example a quality level may be determined, referring e.g. to the accuracy of the elevation angle θ or to the beam width α, or simply the magnitude of the line of sight distance $D_{LOS}$, for a plurality of base stations. The vertical distance estimate may then be calculated based only on the one base station for which the best quality level is determined to have been obtained. A vertical position, such as a certain coordinate, may then be calculated on that single vertical distance estimate as a rule.

As already noted, the step of calculating a vertical distance estimate is carried out in a location server 15 in one embodiment. In addition to using the calculated distance value, the calculation may be based on, inter alia, data representative of at least one of the elevation angle θ, a beam width value α for the corresponding radio beam, and maybe also a vertical height h of an antenna 11 of the base station 10 over a reference level 0. In one embodiment, the relative vertical distance $D_{vr}$ may be taken as the vertical distance estimate, and in that case the vertical height h of the antenna 11 is not required for the calculation of the vertical distance estimate. The vertical height h of an antenna 11 may instead be required to calculate the vertical position, which is preferably also carried out in the location server 15, based on the vertical estimate of one or more of the base stations, as described. In another embodiment, the vertical distance estimate may refer to the reference level 0, and in that case the vertical height h of the antenna 11 is also included in the calculation of the vertical distance estimate.

In one embodiment, base stations send the mentioned data to the location server 15, e.g. through the core network, i.e. the data representative of at least one of the elevation angle θ and beam width value α, and potentially also the vertical height h of the antenna. In another embodiment, each base station rather broadcasts that data. The broadcast data is then detected by the mobile terminal 20 and reported to the location server 15, e.g. together with the time measurement data for the corresponding base station 10, 12, 14.

The calculation of vertical position as described herein is, for various embodiments, based on the notion that it is not a horizontal distance that is retrieved in a time of flight type of assessment of distance, such as OTDOA. Rather, it is time measurement data representative of the line of sight distance that is established. In one embodiment, an improved position in terms of the horizontal distance $D_h$ from the base station 10 to the mobile terminal 20 may also be obtained by using the following equation:

$$D_h = D_{LOS} * \cos(\theta).$$

In principle, aspects described herein improve positioning accuracy of a mobile terminal 20 in a radio network by obtaining the vertical position of the terminal 20 based on an acquired line of sight distance and a beam angle θ of direction in vertical, e.g. as used by an FD-MIMO antenna at the base station 10. While the invention has been discussed in the foregoing on a general level, and with respect to certain embodiments, the references given to 3GPP networks and specifications shall be understood as non-limiting examples of radio communications systems. Furthermore, the skilled person will realise that where not contradictory, the disclosed embodiments above may be combined in various combinations.

The invention claimed is:

1. A method for positioning a mobile terminal in a radio network, comprising:
   for each one of a plurality of base stations, carrying out the steps of:
      transmitting a signal for receipt in the mobile terminal along a line of sight of a radio beam and through an antenna including a plurality of antenna elements;
      receiving time measurement data from the mobile terminal, obtained based on receipt in the mobile terminal of the transmitted signal; and
      calculating a distance value for the distance from the corresponding base station to the mobile terminal based on the time measurement data; and
   the method further comprising the step of calculating, with respect to one or more of the plurality of base stations, a vertical distance estimate of the mobile terminal based on the distance value and an elevation angle of the line of sight of the radio beam for the corresponding base station, wherein the elevation angle is retrieved based on an antenna precoding scheme for said antenna elements; and
   calculating a vertical position for the mobile terminal in dependence of one or more vertical distance estimates according to a predetermined rule.

2. The method of claim 1, wherein the predetermined rule includes the step of averaging a number of factors, each factor being proportional to each one of said vertical estimates.

3. The method of claim 2, wherein each factor is weighted dependent on the corresponding distance value between the UE and the base station.

4. The method of claim 2, comprising the step of receiving a quality estimate of the time measurement in the mobile terminal of the signal transmitted from the respective base station, wherein each factor is weighted dependent on the corresponding quality estimate.

5. The method of claim 2, comprising the step of receiving a beam width and elevation angle values for the respective radio beam in which the signal was transmitted from the respective base station, wherein each factor is weighted dependent on the corresponding beam width value.

6. The method of claim 1, comprising:
determining a quality level for each calculated vertical distance estimate; and
selecting said one or more of said vertical distance estimates according to a quality level criterion.

7. The method of claim 1, comprising:
determining a quality level for each calculated vertical distance estimate; and
selecting the vertical distance estimate having the best quality level as base for calculating the vertical position.

8. The method of claim 6, wherein said quality level is determined dependent on at least one of: the corresponding distance value; a beam width value for the corresponding radio beam; or a quality estimate of the time measurement in the mobile terminal of the signal transmitted from the corresponding base station.

9. The method of claim 1, wherein the step of calculating a vertical distance estimate is carried out in a location server.

10. The method of claim 9, wherein each of said one or more base stations send data to the location server, representative of at least one of: the elevation angle, a beam width value for the corresponding radio beam, or a vertical height of an antenna of the base station over a reference level.

11. The method of claim 9, wherein each of said one or more base stations broadcast data representative of at least one of: the elevation angle, a beam width value for the corresponding radio beam, or a vertical height of an antenna of the base station over a reference level, which data is detected by the mobile terminal and reported to the location server together with the time measurement data for the corresponding base station.

12. The method of claim 6, wherein said quality level correlates to a level of accuracy of the respective vertical distance estimate.

13. A method for positioning a mobile terminal in a radio network including base stations, comprising:
transmitting a signal from a base station for receipt in the mobile terminal along a line of sight of a radio beam and through an antenna including a plurality of antenna elements;
receiving time measurement data from the mobile terminal, obtained based on receipt in the mobile terminal of the transmitted signal;
calculating a distance value for the distance from the base station to the mobile terminal based on the time measurement data; and
calculating a vertical position of the mobile terminal, based on the distance value and an elevation angle of the line of sight of the radio beam, wherein the elevation angle is retrieved based on an antenna precoding scheme for said antenna elements.

14. The method of claim 1, wherein each precoding scheme corresponds to one elevation angle value, wherein the retrieving of said elevation angle includes mapping the precoding scheme to elevation angle in the base station.

15. The method of claim 1, wherein the base stations transmit according to a Multiple Input Multiple Output (MIMO) antenna scheme.

16. The method of claim 1, wherein the calculated distance value represents a line of sight distance.

17. The method of claim 1, wherein said time measurement data represents observed time difference of arrival in the mobile terminal of signals transmitted from two or more base stations.

18. The method of claim 1, wherein said signal includes positioning reference symbols (PRS), and wherein said time measurement data is established based on said positioning reference symbols.

19. The method of claim 1, comprising calculating a horizontal position of the mobile terminal, based on the first distance value and the elevation angle of said line of sight.

20. The method of claim 1, wherein said signal includes data which identifies the radio beam in which it is transmitted, and wherein said time measurement data includes an identification of the identified radio beam.

21. The method of claim 1, wherein the mobile terminal is concurrently connected to at least two base stations, and receives information from each connected base station data which identifies the radio beam in which the respective signal is transmitted.

22. An apparatus for positioning mobile terminals in a radio network, which apparatus comprises a data processing device and is connected to a plurality of base stations which are each configured to transmit signals for receipt in a mobile terminal along a line of sight of a radio beam and through an antenna including a plurality of antenna elements, wherein the apparatus is configured to:
receive time measurement data, obtained based on receipt in the mobile terminal of said transmitted signals, and
calculate a distance value for the distance from base station to the mobile terminal based on the time measurement data for the corresponding base station, wherein the apparatus is configured to calculate a vertical distance estimate of the mobile terminal, based on the distance value and an elevation angle of the line of sight of the radio beam, wherein the elevation angle is retrieved based on an antenna precoding scheme for said antenna elements.

23. The apparatus of claim 22, configured to calculate vertical distance estimates with respect to each one of a number of base stations, and to calculate a vertical position for the mobile terminal in dependence of one or more of said vertical distance estimates according to a predetermined rule.

* * * * *